Sept. 14, 1926.
H. BARNES
1,599,631
DYNAMO ELECTRIC MACHINE
Filed Sept. 9, 1924          2 Sheets-Sheet 1
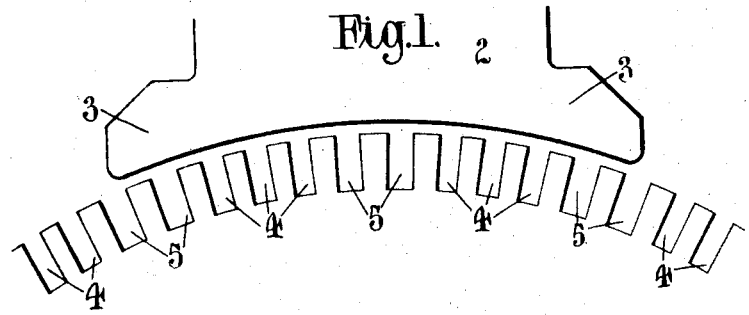
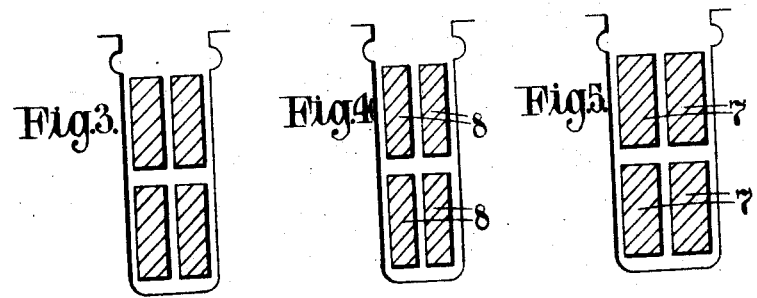
INVENTOR
Herbert Barnes
BY Byrnes, Stebbins, Parmelee
His ATTORNEYS

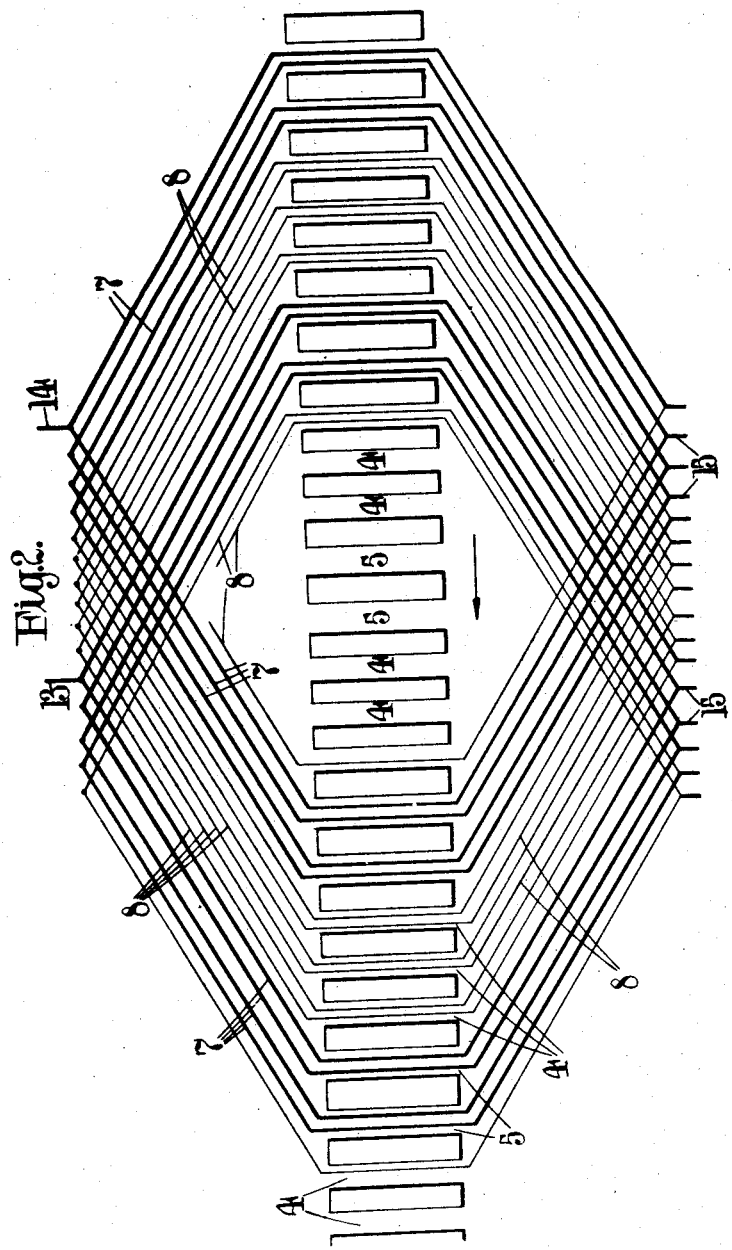

Patented Sept. 14, 1926.

1,599,631

UNITED STATES PATENT OFFICE.

HERBERT BARNES, OF LONDON, ENGLAND, ASSIGNOR TO THE ENGLISH ELECTRIC COMPANY LIMITED, OF LONDON, ENGLAND, A BRITISH COMPANY.

DYNAMO-ELECTRIC MACHINE.

Application filed September 9, 1924, Serial No. 736,736, and in Great Britain November 9, 1923.

In certain types of dynamo electric machines having a winding distributed around the periphery of one element of the machine there exists the characteristic that, although the winding may be uniformly distributed, the current flowing therein is not uniform, being of a higher value in certain parts of the winding than in others. This want of uniformity is, in general, due to the fact that the winding carries two or more component currents differing in value or kind, this difference in conjunction with the methods of leading the currents into and out of the windings having the effect of producing resultant currents of high values in certain parts of the winding and low values in other parts.

An example of a machine element having the features above indicated is found in the armature of a synchronous rotary converter. In this case the turns of the winding adjacent to the tappings by which the alternating current circuits are connected with the armature carry heavier currents than the parts more remote from these points.

A result of this non-uniform distribution of current is the production of non-uniform heating of the machine, the output of which is of course limited by the temperature rise of the hottest point so that the output is lower for the generation of a given amount of heat in the case where this is distributed non-uniformly than in the case where an approximately uniform distribution exists.

With the object of rendering more uniform the distribution of the heating in the armature of a synchronous rotary converter, it has been proposed in the application of Schroeder Serial No. 736,723, filed September 9, 1924, to arrange that the section of the armature conductor is varied from point to point around the core so that the greater section occurs where the higher effective current values are found whereby the resistance loss taking place in the different conductors is rendered more uniform.

The present invention relates to the proportioning of the dimensions of the slots and teeth of the armature of a synchronous rotary converter in which such a variation in the section of the conductor is made and in accordance with the invention this proportioning is carried out in such a way that any material variation in the local reluctance of the path for the magnetic flux for a given position under the pole face as the different teeth move past that point is avoided. Such a variation would be liable to produce local currents in the short circuited windings, which are usually arranged in the pole face of a rotary converter for the purpose of damping or starting, unless special steps were taken to prevent their occurrence. In a rotary converter arranged in accordance with the present invention it is possible to utilize a short circuited pole face winding of the ordinary type in conjunction with an armature conductor arrangement in which the section is varied from point to point.

The grading of the section of the conductor with appropriate changes in the dimensions of the slots in cases where the winding is arranged in slots, will generally be done in steps in order to comply with practical requirements, the number of steps being limited by considerations of the relative advantage and cost of obtaining a more or less close approximation to uniform distribution of resistance losses. Where grading the section of the conductor is employed in connection with rotary converters having the armature winding arranged in slots of constant depth distributed around the core, the width of the slots will in general be varied in accordance with the grading of the conductor.

An example of the invention applied to such a case will now be described with reference to the accompanying drawings. Figure 1 shows diagrammatically an end view of a part of the slotted circumference of the armature of a six pole rotary converter without any winding and with one pole and pole shoe of the associated field system. Figure 2 shows a developed circumferential view of some of the armature slots as well as several armature coils placed in position therein. Figure 3 is a sectional view of one of the armature slots of a rotary converter not provided with the graded winding. Four conductors are shown in the slot. Figures 4 and 5 show by comparsion similar views of two slots and their associated conductors suitable for use in the armature of the same rotary converter after providing it with a graded armature winding arranged as in Figures 1 and 2.

In Figures 1 and 2 the six pole armature having fifteen slots, of equal depth, per pole, is denoted by 1. One of the six poles is denoted by 2 having a pole shoe 3. The ninety armature slots are arranged around the armature circumference in eighteen groups of five slots per group (each group occupying sixty electrical degrees of the armature circumference) and three of each five are narrow slots 4 and two are wide slots 5. The armature winding scheme will be clear from an examination of Figure 2 wherein the wide conductors 7, shown by heavy lines, are arranged in the wide slots 5 (this arrangement corresponds to Figure 5) and the narrow conductors 8, shown by light lines, are arranged in the narrow slots 4 (corresponding to Figure 4). The wide conductors 7 are tapped at points 13 and 14, etc., at intervals of sixty electrical degrees around the winding and connected to six slip rings in the usual manner. The particular points at which the wide conductors are tapped depend upon the power factor, but with a leading power factor which is the usual case in practice and with the type of winding shown those conductors which carry the largest currents in Figure 2 are those which lie in the direction of rotation of the armature from the tapping points. This is why most of the wide conductors are shown in Figure 2 to the left of the tapping points, it being assumed that the armature rotates in the direction of the arrow. The tappings 15 go in usual manner to the commutator segments.

In Figures 1 and 2 it will be observed that the pitch length between the centre lines of adjacent slots is not uniform but is varied in such a way that, notwithstanding the varying width of the slots, each part of the armature periphery which constitutes a tooth pitch contains approximately the same proportions of slot and tooth and thus material variation in the local reluctance of the path for the magnetic flux through the teeth for a given position under the pole face is avoided.

What I claim as my invention and desire to secure by Letters Patent is:—

1. In a synchronous rotary converter, a field structure and an armature, the latter comprising a slotted core, a winding in the slots having connectors leading to commutator segments and serving for the passage of direct current and having tappings for the passage of alternating currents, the section of the conductors of which the armature winding is formed being varied from point to point in such a way that the greater section is found near the points at which the tappings for the alternating currents are located where the higher effective current values exist, the slots being varied in dimensions to accommodate the said variation in section, and the proportioning of slots and teeth being carried out in such a way that material variation in the local reluctance of the path for the flux through the teeth for a given position under a pole face of said field structure is avoided.

2. In a synchronous rotary converter, a field structure and an armature, the latter comprising a slotted core, a winding in the slots having connectors leading to commutator segments and serving for the passage of direct current and having tappings for the passage of alternating currents, the section of the conductors of which the armature winding is formed being varied from point to point in such a way that the greater section is found near the points at which the tappings for the alternating currents are located where the higher effective current values exist, the said conductors being accommodated in slots of uniform depth and varying width, the width of the teeth being also varied so that at all points of the armature periphery the tooth pitch measured thereon contains approximately the same proportions of slot and tooth.

3. In a rotary converter, a field structure having poles, an armature having a slotted core, the slots being of varied widths and spaced apart varied distances, thereby forming teeth of varied widths between the slots, the widths of adjacent slots and the distance between them being so proportioned that any given tooth pitch on the periphery of the armature contains substantially the same ratio of slot to tooth as any other tooth pitch, thereby providing a substantially constant local reluctance in the path of the magnetic flux through the teeth for any given position under a pole face.

In testimony whereof I affix my signature.

HERBERT BARNES.